United States Patent [19]
Kelly

[11] Patent Number: 5,787,101
[45] Date of Patent: Jul. 28, 1998

[54] SMART CARD MESSAGE TRANSFER WITHOUT MICROPROCESSOR INTERVENTION

[75] Inventor: Michael Gene Kelly, Fishers, Ind.

[73] Assignee: Thomson Consumer Electronics, Inc., Indianapolis, Ind.

[21] Appl. No.: 851,158

[22] Filed: May 5, 1997

Related U.S. Application Data

[63] Continuation of Ser. No. 260,170, Jun. 15, 1994, abandoned.

[51] Int. Cl.$^6$ ........................................................ G06F 3/00
[52] U.S. Cl. ............................................ 371/49.1; 235/380
[58] Field of Search ............................ 371/49.1; 235/380

[56] References Cited

U.S. PATENT DOCUMENTS

| | | | |
|---|---|---|---|
| 4,509,210 | 4/1985 | Kohn | 455/349 |
| 4,882,474 | 11/1989 | Anderl et al. | 235/380 |
| 5,111,504 | 5/1992 | Esserman et al. | 380/21 |
| 5,144,664 | 9/1992 | Esserman et al. | 380/20 |
| 5,149,945 | 9/1992 | Johnson et al. | 235/380 |
| 5,204,663 | 4/1993 | Lee | 340/825.34 |
| 5,227,614 | 7/1993 | Danielson et al. | 235/380 |
| 5,237,610 | 8/1993 | Gammie et al. | 380/10 |
| 5,319,751 | 6/1994 | Garney | 395/200 |
| 5,379,344 | 1/1995 | Larsson et al. | 380/23 |
| 5,442,704 | 8/1995 | Holtey | 380/23 |
| 5,448,045 | 9/1995 | Clark | 235/382 |
| 5,481,609 | 1/1996 | Cohen et al. | 380/16 |
| 5,491,827 | 2/1996 | Holtey | 395/800 |

FOREIGN PATENT DOCUMENTS

| | | | |
|---|---|---|---|
| 0583723A1 | 2/1994 | European Pat. Off. | G06K 7/00 |
| WO92/01259 | 1/1992 | WIPO | G06F 15/30 |
| WO93/07715 | 4/1993 | WIPO | H04N 7/16 |

OTHER PUBLICATIONS

Jones, S., et al., "Authentication in a UNIX Network Environment Using Smart Cards", UK IT (IEE Conf. Pub. 316), pp. 32–37, Jan. 1990.

U.S. patent application No. 08/232,794, Tamer et al., filed Apr. 22, 1984.

International Standard, ISO 7816-1 "Identification Cards–Integrated Circuits(s) Cards with Contacts" Part 1: Physical characteristics.

International Standard, ISO 7816-2 "Identification Cards–Integrated Circuit(s) Cards with Contacts" Part 2: Dimensions and location of the contacts.

International Standard, ISO 7816-3 "Indentification Cards–Integrated Circuit(s) Cards with Contacts" Part 3: Electronic signals and transmission protocols.

*Primary Examiner*—Stephen M. Baker
*Attorney, Agent, or Firm*—Joseph S. Tripoli; Peter M. Emanuel; Robert D. Shedd

[57] ABSTRACT

A signal processing system includes a system control processor, an integrated circuit (IC) card, or smart card, for access control processing, system memory, and a smart card interface circuit including a direct memory access interface circuit for providing high speed access to the system memory. Data transfers between the smart card and system memory occur via the smart card interface circuit and the direct memory access interface circuit. The system controller initializes the smart card interface circuit prior to a transfer and, after a transfer is complete, processes transferred data that is stored in system memory. Processing by the system controller is not required during the transfer to complete the transfer. The smart card interface circuit also filters the transferred data stream by checking and generating parity bits as required and removing smart-card related control data from the data that is stored in memory.

12 Claims, 3 Drawing Sheets

5,787,101

SMART CARD MESSAGE TRANSFER WITHOUT MICROPROCESSOR INTERVENTION

This is a continuation of application Ser. No. 08/260,170 filed Jun. 15, 1994 abandoned.

FIELD OF THE INVENTION

The present invention involves access control systems including an integrated circuit (IC) card, or "smart" card, for limiting access to information in signal processing applications.

BACKGROUND

Signal processing systems may include access control systems that limit access to the information in certain signals. For example, pay-TV systems include access control sub-systems that limit access to particular programs or channels. Only users who are entitled (e.g., paid a fee) are permitted to view the programs. One approach to limiting access is to modify the signal by, for example, scrambling or encrypting the signal. Scrambling typically involves modifying the form of the signal using methods such as removing synchronization pulses. Encryption involves modifying a data component included in the signal according to a particular cryptographic algorithm. Only individuals who are entitled to access are given the "key" needed to descramble or decrypt the signal.

Access control systems may include an integrated circuit (IC) card, or "smart" card, feature. A smart card is a plastic card the size of a credit card that has a signal processing IC embedded in the plastic. A smart card is inserted into a card reader that couples signals to and from the IC in the card. International Standards Organization (ISO) standard 7816 establishes specifications for an IC card interface. ISO 7816-2 specifies that the electrical interface to the card will be via eight contacts positioned on the card surface. In addition to power and ground supply terminals, the interface includes a serial input output (I/O) data signal terminal for communicating data between the smart card and the signal processing system external to the smart card.

A signal processing system typically includes a system controller such as a microprocessor for controlling various signal processing functions in the system. The IC in a smart card includes a security controller for performing various security control functions such as generating the key for descrambling a scrambled data component of the signal. Both the system controller and the security controller process data stored in system memory. Data is communicated between the security controller and system memory via the system controller. A data transfer between the system controller and the security controller includes message data, e.g., key information, and control data such as a parameter specifying the number of bytes of message data included in a particular data transfer.

Data transfer between system memory and the security controller involves the system controller accessing system memory, data transfer between the system controller and a smart card interface circuit (SCI) included in the system, and data transfer between the SCI and the security controller via the serial interface terminal of the smart card. Accessing data in system memory via the system controller is a relatively slow process that limits the availability of the system controller and system memory for other tasks. In addition, all data included in the smart card message is stored in system memory, i.e. both smart card control data and message data.

SUMMARY OF THE INVENTION

The present invention resides, in part in recognizing the described problem and, in part, in providing a solution to the problem. A signal processing system constructed in accordance with principles of the invention comprises a first controller for controlling a signal processing function in a signal processing channel, a memory, and an interface device for transferring data between the memory and a second controller included in an integrated circuit card external to the system via a signal path including the interface device and not including the first controller. The interface device processes transferred data to remove a control portion of the transferred data.

BRIEF DESCRIPTION OF THE DRAWING

The invention may be better understood by referring to the accompanying drawing in which.

DETAILED DESCRIPTION

Figure 1:
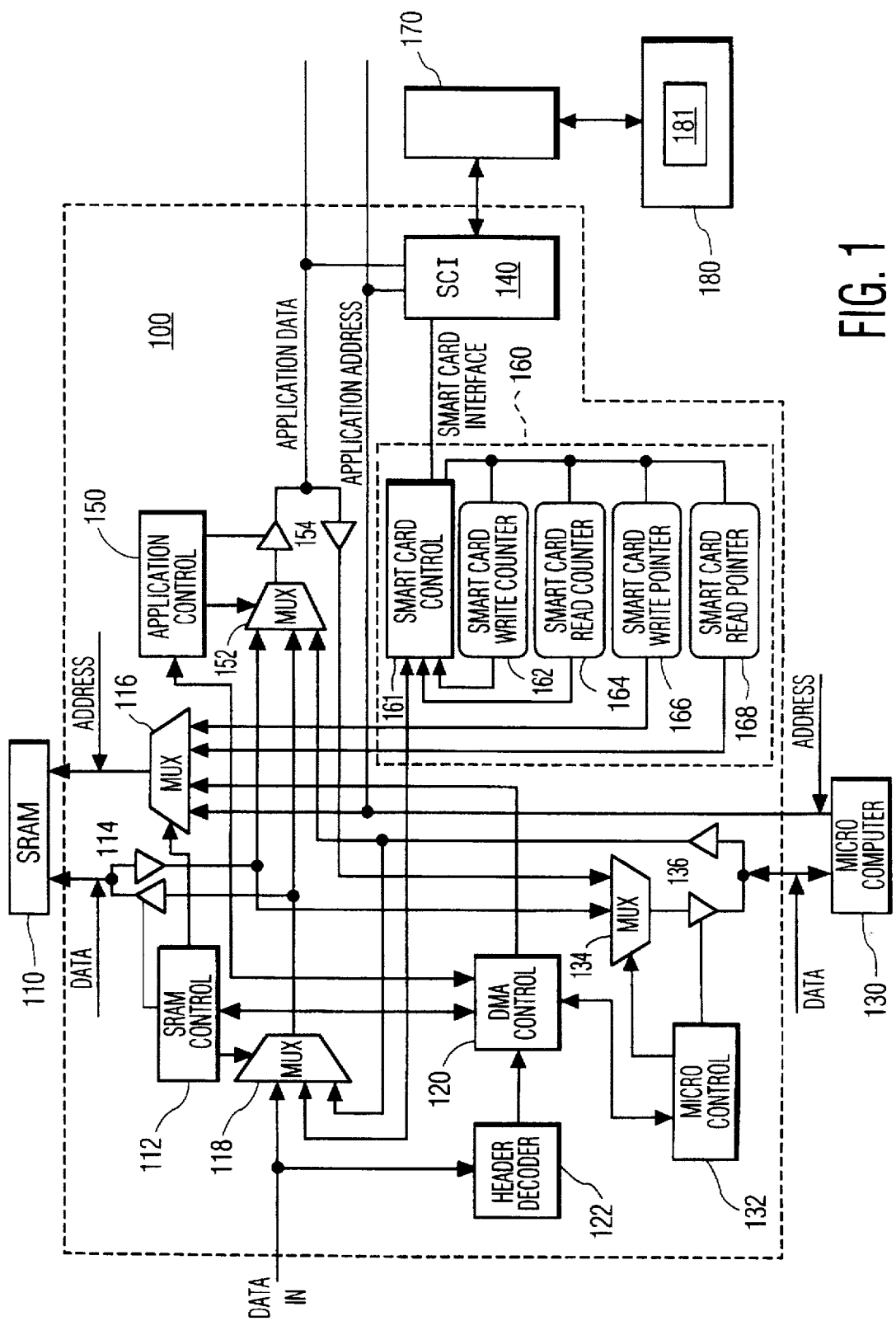
FIG. 1 shows, in block diagram form, a portion of a signal processing system including the invention.

FIG. 1 shows, in block diagram form, a portion of a signal processing system included in a direct broadcast satellite video signal processing system. One example of such a system is the DSS™ (Direct Satellite System) system developed by Thomson Consumer Electronics, Inc., Indianapolis, Indiana. FIG. 1 shows features of the system including a system controller comprising microcomputer 130, system memory comprising SRAM 110, and a portion of a "transport" integrated circuit (TIC) 100 outlined in phantom. TIC 100 processes an input data signal "Data-In" representing information included in a television signal, e.g., video image data. The television signal is tuned by a tuner (not shown in FIG. 1).

Signal Data-In includes "packetized" data, i.e. the data is arranged in packets of multiple bytes of data. Each packet includes a "header" portion that defines the content of the non-header, or "payload", portion of the packet. For example, the header may indicate that the packet includes video data for programming on channel 5. In FIG. 1, header decoder 122 of TIC 100 decodes the header data to determine how the packet payload is processed. For example, payload data may be stored in RAM 110 as follows. Header decoder 122 decodes the header and sends a signal to direct memory access control (DMAC) unit 120 requesting a data store operation. DMAC 120 responds by controlling multiplexer (MUX) 118 and RAM data control 114 to couple signal Data-In to the data input of RAM 110. DMAC 120 also provides the address input to RAM 110 via MUX 116.

Another function of TIC 100 is to provide an interface between the system and a smart card (or integrated circuit (IC) card) such as smart card 180 in FIG. 1. Smart card 180 provides access control related data processing capability. The smart card interface in TIC 100 formats communications between the system and smart card 180 according to a particular smart card communications protocol. For example, TIC 100 provides a full type T=0 asynchronous half duplex character transmission protocol as defined in ISO Standard 7816-3 §§5 through 8. Each transmission to or from the smart card comprises one or more characters. A character comprises a start bit, eight data bits, and a parity bit. As will be described in more detail below, the smart card interface in TIC 100 comprises smart card interface (SCI) unit 140 and smart card direct memory access interface (DMAI) unit 160 in FIG. 1.

TIC 100 is connected to smart card 180 via card reader 170. Smart card 180 is removably mounted in card reader 170 when the card is being used. Card reader 170 connects smart card interface signals between SCI unit 140 in TIC 100 and terminals located on a surface of smart card 180. The interface signals and terminal locations on smart card 180 are specified in ISO standard 7816-2. An IC 181 mounted on smart card 180 is a controller (e.g.; a security controller) or signal processor that is coupled to the terminals to receive the interface signals.

The operation of TIC 100 is controlled by a system controller external to TIC 100, comprising microprocessor (µP) 130, and by micro-control (µC) unit 132 internal to TIC 100. Control signals generated by µC 132 control MUX 134 and data control unit 136 to determine the source of data signals coupled from TIC 100 to µP 130. Possible data sources include RAM 110 and "application" data such as status information from SCI 140 regarding the status of the smart card interface. Application data, e.g., smart card interface status information, is transferred to µP 130 via data control unit 154. The control procedures executed by the system controller may include generating addresses for RAM 110 via MUX 116.

Control data for controlling the smart card interface is transferred from µP 130 to SCI 140 via the application data path including MUX 152. MUX 152 is controlled by application control unit 150 to select the source of "out-going" (out of TIC 100) application data. Other possible sources of out-going application data that can be selected using MUX 152 include the Data-In signal via MUX 118 and RAM 110.

Under the above-described type T=0 smart card communications protocol, all data transfers between smart card 180 and the system are initiated by the system controller. For example, µP 130 sends a command to smart card 180 directing smart card 180 to perform a particular operation such as decryption key generation. Another command is issued by µP 130 directing smart card 180 to transfer status information, e.g., the status of the current operation, to the system. When the status information indicates that the operation is complete and, µP 130 is prepared to receive data from smart card 180, µP 130 issues another command directing smart card 180 to send the results of the operation, e.g., the decryption key, to TIC 100.

Prior to beginning a transfer, µP 130 initializes control parameters stored in memory-mapped command registers in SCI 140. The command registers are addressed and read or written by RP 130 via the application address and data buses. SCI 140 also includes memory-mapped status registers for storing data representing the status of SCI 140. The status registers are accessed by the system controller in the same manner as the command registers to determine the status of the smart card interface.

After being initiated by µP 130, features shown in FIG. 1 including DMAI 160 and SCI 140 permit a data transfer between smart card 180 and RAM 110 to be completed without intervention by µP 130 during the transfer. During a transfer of data to smart card 180, SCI 140 accepts data from DMAI 160, generates a parity bit, and clocks the data out to the smart card. Conversely, SCI 140 accepts data from smart card 180, performs a parity check, and provides the data to DMAI 160. DMAI 160 directly transfers data to and from RAM 110. Data transmission between DMAI 160 and SCI 140 is controlled by handshake signals.

As shown in FIG. 1, DMAI 160 includes smart card control unit 161 coupled to two counter registers 162 and 164 and coupled to two pointer registers 166 and 168. Register 162 is a write counter register that stores a count of the number of bytes of data written to RAM 110. The count in register 162 is incremented (or decremented) by smart card control 161 as each byte is written to RAM. Smart card control 161 also evaluates the count value to determine when all bytes have been transferred. Similarly, register 164 stores a count of the number of bytes of data read from RAM 110 under control of smart card control 161. During smart card operations, registers 166 and 168 provide write and read addresses, respectively, for RAM 110. The appropriate address pointer register is loaded with the initial address value at the beginning of a smart card transfer and updated, e.g., incremented or decremented, by smart card control 161 as each byte is transferred.

Figure 2:
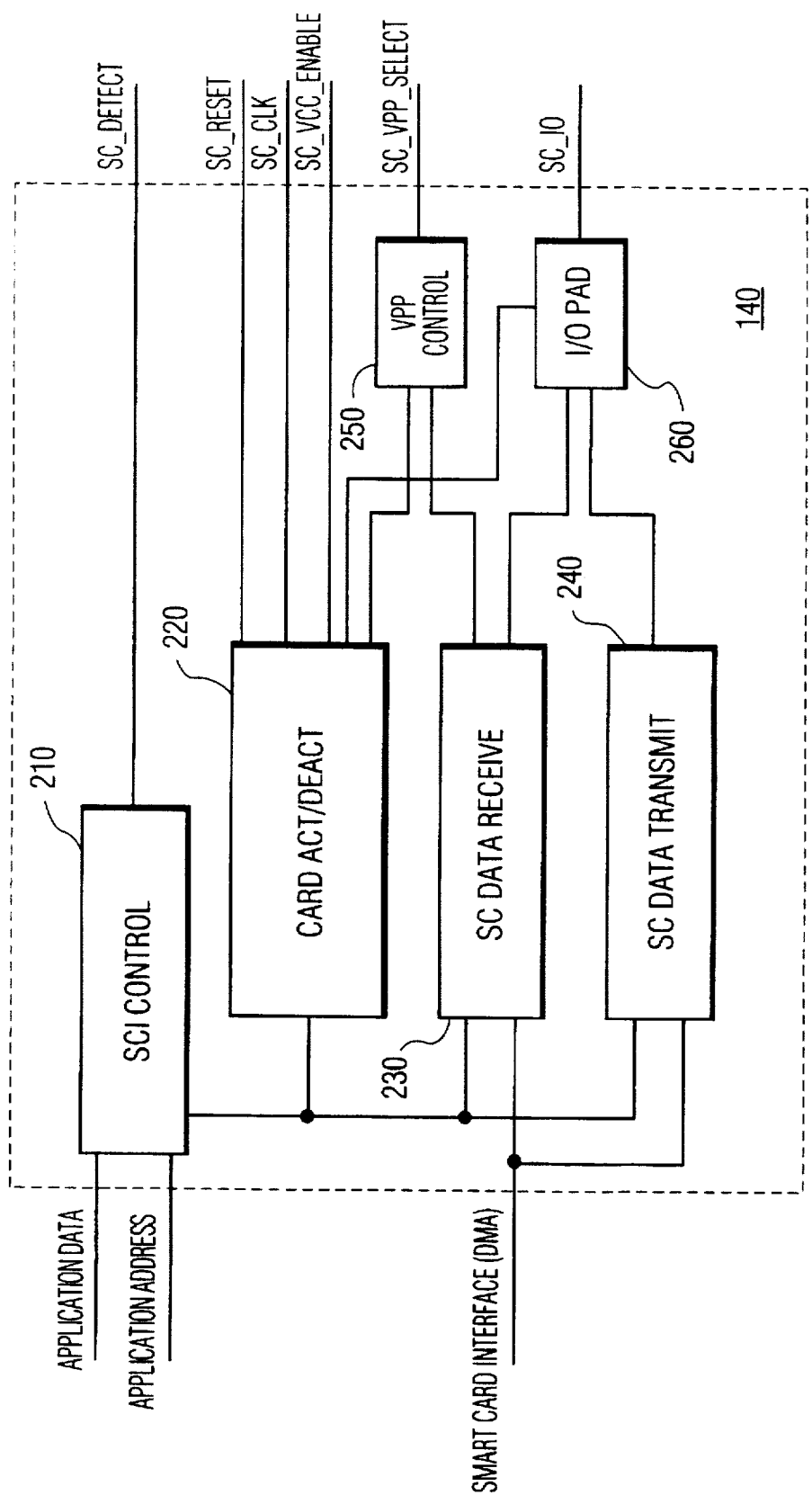
FIG. 2 shows, in block diagram form, an embodiment of a feature shown in FIG. 1.

FIG. 2 shows a block diagram of an embodiment of SCI 140. In FIG. 2, SCI control unit 210 receives signal SC-DETECT from smart card reader 170 in FIG. 1 indicating when smart card 180 is inserted in card reader 170. Unit 210 responds to smart card 180 being inserted by generating an interrupt to µP 130. If µP 130 has not already enabled SCI control unit 210, it will do so at this time. In response, unit 210 enables smart card activation/deactivation unit 220 to activate smart card 180.

Unit 220 responds to being enabled by generating signal SC-VCC-ENABLE to enable the source of smart card supply voltage VCC that is included in card reader 170. After a delay sufficient to ensure that power is applied to smart card 180, unit 220 places the smart card serial input/output (I/O) pad of TIC 100 in "reception" mode so that SCI 140 can receive serial data from smart card 180 via serial I/O signal SC-IO. In addition, unit 220 controls VPP control unit 250 to produce an "idle" state on control signal SC-VPP-SELECT at the output of unit 250. A voltage source in card reader 170 controlled by signal SC-VPP-SELECT supplies voltage VPP, an EPROM programming voltage, to smart card 180. The idle state of signal SC-VPP-SELECT causes the voltage source to set voltage VPP to a value that disables EPROM programming. Unit 220 also provides smart card clock signal SCCLK to smart card 180 and generates signal SC-RESET to reset the smart card. Smart card 180 responds to signal SC-RESET by generating an "answer-to-reset" data sequence on signal SC-IO as specified in ISO standard 7816-3 §6.

Smart card data receiver 230 is coupled to I/O pad 260 to receive and buffer serial data input to TIC 100 from smart card 180, such as the answer-to-reset sequence. Receiver 230 includes a shift register which receives the serial data stream and converts the serial data into data words suitable for transfer via parallel data paths within TIC 100 to RAM 110. DMAI 160 and all memory mapped control registers in SCI control unit 210 are initialized before SCI 140 begins receiving data from smart card 180. Data words produced by receiver 230 are written into RAM 110 via DMAI 160, MUX 118 and data direction control unit 114. DMAI 160 in FIG. 1 is coupled to receiver 230 and generates write addresses for RAM 110 as data is being received. DMAI 160 also maintains a count of the number of words of data received. When all data has been received from smart card 180, i.e. the transfer is complete, smart card control unit 210 generates an interrupt to µP 130.

Data transferred from RAM 110 in TIC 100 to smart card 180 is transferred via smart card data transmitter 240, data direction control unit 114, MUX 152, the application data bus and SCI control 210. Each data word read from RAM 110 is loaded into a shift register in unit 240. The data in the shift register is shifted out of TIC 100 via I/O pad 260 to produce a serial data stream in signal SC-IO. Data transmitter 240 is coupled to DMAI 160 in FIG. 1 which generates the addresses for reading data from RAM 110 and maintains a count of the number of words of data transferred to smart card 180. Control unit 210 generates an interrupt to µP 130 after all data has been transferred to smart card 180.

The embodiment of SCI 140 shown in FIG. 2 supports both multi-byte and single-byte transfers in accordance with the type T=0 protocol specified in ISO standard 7816-3. As stated above, each transfer of data, whether single or multi byte, is initiated by the system controller, i.e. µP 130. An example of the operation of the system shown in FIGS. 1 and 2 according to the type T=0 protocol is described below.

When µP 130 determines that a transfer is to occur, control registers in SCI 140 are initialized by µP 130 as described above. SCI 140 generates a serial data stream comprising control and message data that is coupled from SCI 140 to smart card 180 via serial data signal SC-IO. Control data generated by SCI 140 includes a command "header" inserted at the beginning of the data stream that comprises five successive bytes of data designated: CLA, INS, P1, P2, P3. The value of CLA (the first byte of the header) defines an instruction "class". The INS byte defines the instruction. P1, P2, and P3 are parameters of which P1 and P2 may be an address and P3 specifies the number of data bytes that are included in the message portion of the data stream, i.e. the number of bytes of data that follow the header.

After the five-byte header is transmitted by SCI 140, smart card 180 responds with a "procedure" byte as defined in §8.2.2 and Table 9 of ISO standard 7816-3. For example, the value of a procedure byte designated "acknowledge", or ACK, is compared to the value of the instruction byte, INS, in SCI 140. If ACK equals INS or INS+1, all remaining data bytes are transmitted, thereby providing multi-byte transmission capability. If ACK equals the logical complement of INS or INS+1, only the next data byte is transferred, thereby providing single byte transmission capability. For either type of transfer, a counter in SCI 140 counts the number of bytes transferred and compares the count to the number of bytes in the message as defined by parameter P3 in the header. When all bytes have been transferred, procedure bytes SW1 and SW2 are transmitted by smart card 180 indicating "end of command" and the transmission terminates. The value of procedure bytes SW1 and SW2 provides end-of-message status information, e.g., "normal end" or "incorrect message length", as specified in ISO 7816-3 §8.2.2.3.

Figure 3A:
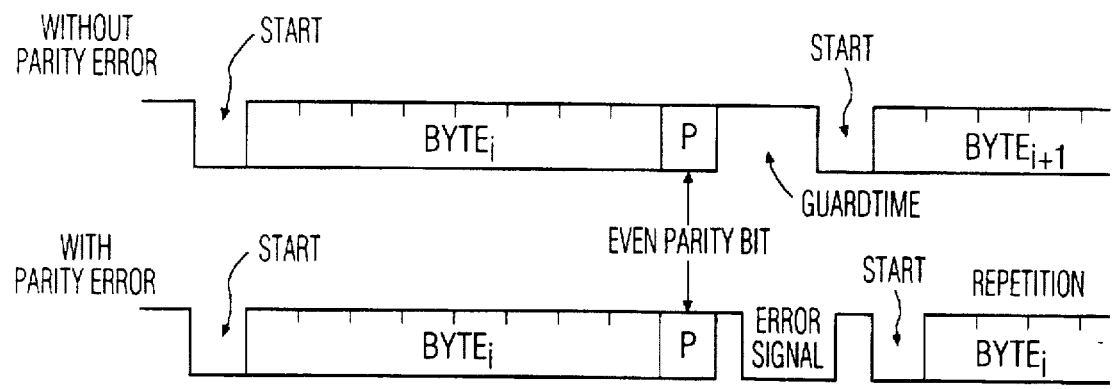
FIGS. 3A and 3B illustrate signal waveforms useful for understanding the operation of the system shown in FIGS. 1 and 2.

SCI 140 also provides parity processing of transferred data as specified in ISO 7816-3 §6.1.3. During a multi-byte data transfer from smart card 180, SCI 140 checks the parity of each byte of data received and, in response to a parity error, generates an error signal in signal SC-IO in accordance with §8.2 and FIG. 8 in ISO 7816-3. Smart card 180 responds to the error signal by retransmitting the erroneous byte. FIG. 3A illustrates a typical signal waveform in signal SC-IO for both an error-free condition (upper waveform in FIG. 3A) and a parity-error condition (lower waveform in FIG. 3A). When transferring data to smart card 180, SCI 140 generates an appropriate parity bit for each byte and inserts the parity bits in the serial data stream. If smart card 180 detects a parity error in data from SCI 140, smart card 180 generates an error signal on signal SC-IO as shown in the lower waveform in FIG. 3A. SCI 140 responds to the error signal by re-transmitting the erroneous byte.

Single byte data and command transfers occur in a similar manner. For a single byte outgoing transfer (to smart card 180), SCI 140 receives a data byte from DMAI 160, generates a parity bit, and transfers the character to the card. For a single byte in-coming transfer (from the smart card), SCI 140 receives a character from the card, checks for parity errors, and provides the data byte to DMAI 160. Character repetition is provided in the case of a transmission error as indicated by generation of an error signal by the receiving device. For all transfers, the transfer rate is programmable as specified in §6.1.4.4 and Table 6 of ISO 7816-3.

A command transfer begins with the system controller setting the transfer direction flag in the SCI command register to indicate whether data is to be transferred to or from the card. The system controller also sets the command process start flag which indicates that the next byte sent to SCI 140 from DMAI 160 is the first byte of the command header. For an out-going transfer, i.e. from TIC 100 to smart card 180, SCI 140 transmits each byte of the command header and each byte of data as each byte is received from DMAI 160 until P3 bytes of data have been transferred. For an in-coming transfer, i.e. from smart card 180 to TIC 100, SCI 140 receives the appropriate number of bytes from the card and transmits each data byte to DMAI 160 until P3 bytes have been received.

In addition to decoding the ACK and SW1, SW2 procedure bytes as described above, SCI 140 also decodes "NULL" (no action) procedure bytes and determines from the value of ACK procedure bytes whether the VPP voltage (voltage for programming EPROM in the smart card) is active or idle. The ACK byte values and the corresponding state of VPP are shown in Table 9 of ISO standard 7816-3. As described above, the state of voltage VPP is controlled by signal SC-VPP-SELECT generated by VPP control unit 250 in FIG. 2. Signal SC-VPP-Select is generated in response to the information decoded from the ACK byte.

Only a portion of the data received from smart card 180 is stored in RAM 110. SCI 140 "filters" the data stream from smart card 180 to remove control information such as certain procedure bytes. In particular, ACK and NULL procedure bytes control the data transfer while the transfer is occurring. These procedure bytes are not needed after the transfer is complete. SW1 and SW2 procedure bytes are analyzed after a transfer is complete to determine the status at the end of the transfer, e.g., whether the transfer was completed successfully. Thus, SW1 and SW2 procedure bytes are stored in RAM 110 along with the message data for further analysis by µP 130.

Figure 3B:
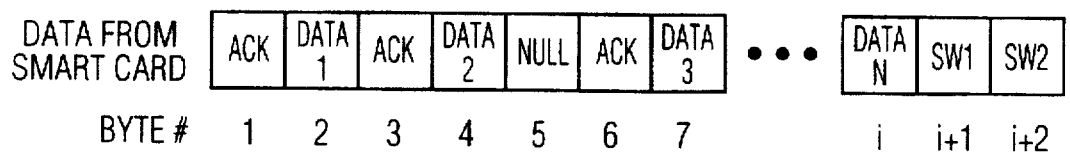
Figure 3B:
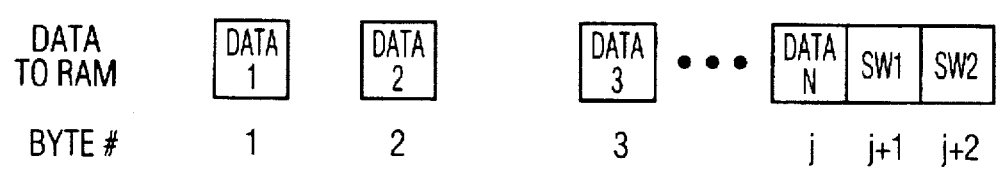

The filtering operation performed by SCI 140 to remove unnecessary control bytes is illustrated in FIG. 3B. The upper portion of FIG. 3B depicts a typical data stream from smart card 180 that includes procedure bytes interspersed with data bytes. The lower portion of FIG. 3B illustrates the data stream from smart card 180 after processing by SCI 140 and DMAI 160 to produce a filtered data stream that is stored in RAM 110. Procedure bytes other than SW1 and SW2 are removed from the data stream by the filtering operation.

When the data bytes and the SW1 and SW2 procedure bytes have been transferred to DMAI 160 and into SRAM 110, an interrupt is generated for µP 130. The system controller responds to the interrupt by retrieving data from RAM 110 and processing the data as required. During the interval between the beginning of a data transfer (SCI 140 command registers being initialized) and the end of the data transfer (interrupt flag being generated), all communications between the system and the smart card occur without intervention by the system controller.

In addition to improving the availability of the system controller, SCI 140 and DMAI 160 also provide the above-described "filtering" feature. Unlike known direct memory access features, the filtering operation provided by SCI 140 improves both the efficiency with which data is stored in RAM 110 and the integrity of stored data. As described above, the filtering operation eliminates unnecessary data bytes, such as control data, from the data stream. Thus, the quantity of smart card data that must be stored in RAM 110 is reduced. The integrity of smart card data that is stored in RAM 110 is improved by the above-described parity processing feature for detecting errors and by the data byte retransmission feature for eliminating errors.

I claim:

1. Apparatus comprising:

a signal processing channel for processing an input signal;

a microprocessor for controlling a signal processing operation of said signal processing channel;

a memory coupled to said signal processing channel for storing data; and interface means for coupling a data signal between said memory and a controller included in an integrated circuit (IC) card via a signal path exclusive of said microprocessor;

said interface means performing a filtering operation on said data signal coupled between said memory and said controller.

2. The apparatus of claim 1 wherein said filtering operation comprises removing a component of said data signal during transfer of data from said controller to said memory.

3. The signal processing apparatus of claim 2 wherein said component removed from said data signal comprises control data for controlling data transfer between said IC card and a signal processing system comprising said signal processing channel, said microprocessor and said memory.

4. The apparatus of claim 3 wherein said control data comprises an ACK procedure byte or a NULL procedure byte.

5. The apparatus of claim 1 wherein said filtering operation comprises inserting a data component into said data signal during transfer of data from said memory to said controller.

6. The apparatus of claim 5 wherein said data component inserted into said data signal comprises parity information.

7. The apparatus of claim 1 wherein said filtering operation comprises removing a first data component from said data signal during transfer of data from said controller to said memory and inserting a second data component into said data signal during transfer of data from said memory to said controller;

said first data component comprising an ACK procedure byte or a NULL procedure byte;

said second data component comprising parity data.

8. Signal processing apparatus comprising:

a signal processing channel for processing an input signal to produce an output signal;

a memory for storing data;

a microprocessor coupled to said signal processing channel and to said memory for controlling said signal processing channel in response to control data stored in said memory;

a smart card reader for receiving said control data from a smart card removably mounted in said smart card reader; and interface means for receiving said control data from said smart card reader and for storing said control data in said memory via a signal path exclusive of said microprocessor;

said interface means removing a portion of said control data received from said smart card reader before storing said control data in said memory.

9. The apparatus of claim 8 wherein said portion of said control data removed by said interface means comprises an ACK procedure byte or a NULL procedure byte.

10. A method for transferring data from a smart card to a memory in a signal processing system comprising the steps of:

generating output data at said smart card;

receiving said output data at an interface device via a first signal path exclusive of a microprocessor controlling said signal processing system;

filtering said output data in said interface device to produce filtered output data;

sending said filtered output data to said memory via a second signal path exclusive of said microprocessor.

11. The method of claim 10 wherein the step of filtering said output data comprises the step of removing control data from said output data if said output data is received from said smart card.

12. The method of claim 11 wherein said control data removed from said output data comprises an ACK procedure byte or a NULL procedure byte.

* * * * *